United States Patent [19]

Baylor

[11] 4,204,716
[45] May 27, 1980

[54] TRACK JOINT WITH A THRUST RING AND A SEAL RING

[75] Inventor: John M. Baylor, Bettendorf, Iowa

[73] Assignee: J. I. Case Company, Racine, Wis.

[21] Appl. No.: 910,202

[22] Filed: May 30, 1978

[51] Int. Cl.$^2$ .................... B22D 55/00; F16J 15/38
[52] U.S. Cl. .................................... 305/11; 277/92;
 277/96.1; 277/206 R; 305/58 R
[58] Field of Search ............... 305/11, 14, 58 R, 59;
 277/92, 96.1, 95, 96.2, 96, 83, 206 R

[56] References Cited
U.S. PATENT DOCUMENTS

| 3,178,239 | 4/1965 | Zeller | 305/11 |
| 3,841,718 | 10/1974 | Reinsma | 305/11 |
| 3,958,836 | 5/1976 | Brown | 305/14 |
| 4,030,730 | 6/1977 | Maguire | 277/92 |

Primary Examiner—David A. Scherbel
Attorney, Agent, or Firm—Arthur J. Hansmann

[57] ABSTRACT

A track joint with a thrust ring and a seal ring wherein there is a track pin and a cylindrical bushing on the pin and two track links. The end of the bushing and one of the track links present annular surfaces faced toward each other but spaced apart. A thrust ring extends between the annular surfaces and a seal ring is on the thrust ring and extends in two legs radially outwardly from the thrust ring and into contact with the respective annular surfaces for sealing therewith.

5 Claims, 4 Drawing Figures

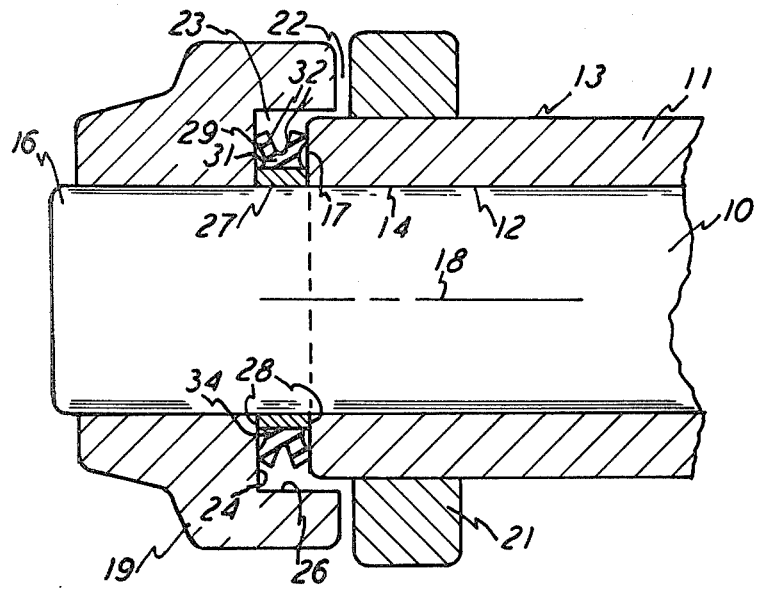
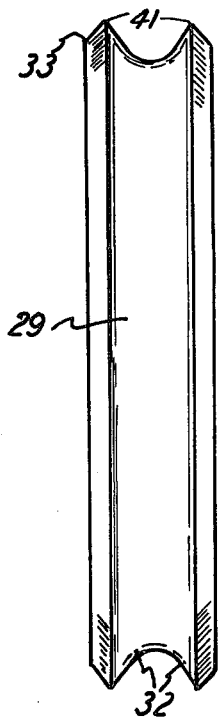
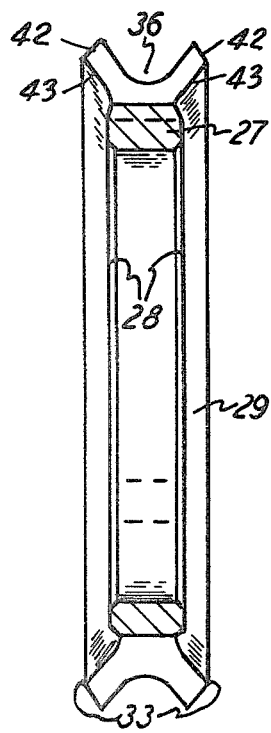
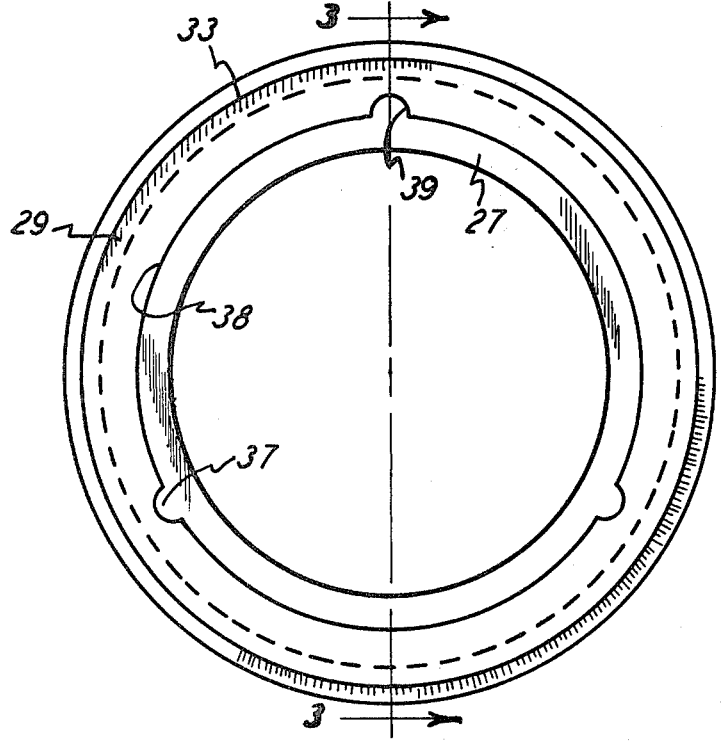

TRACK JOINT WITH A THRUST RING AND A SEAL RING

This invention relates to a track joint with a thrust ring and a seal ring, and, more particularly, it relates to the track joint of the type used in a track chain on crawler tractors.

BACKGROUND OF THE INVENTION

The prior art is already aware of various arrangements of track joints for crawler tractors, and those joints include thrust rings and seal rings. The purpose is to have a sturdy joint which is sealed against the entry of dirt and the like so that the joint can remain clean and functional with only a minimum of friction and wear. Examples of the prior art utilizing a rigid ring and an elastomer seal member or the like are found in U.S. Pat. Nos. 2,911,840 and 3,110,097 and 3,554,560 and 3,595,572 and 3,622,165 and 3,680,924 and 3,975,028. Also, my own U.S. Pat. No. 4,076,333 shows the use of a metal ring and an elastomer seal member, and my U.S. Pat. No. 3,948,574 shows the use of an elastomer member only in a track joint, and the same is true of a U.S. Pat. No. 3,909,076.

In the prior art, there is no known instance of a track joint which has a thrust ring and a seal ring secured thereto, and with two rings extending in axial abuttment between two annular surfaces presented by the track joint itself. Thus, in that instance, the thrust ring maintains the annular surfaces spaced apart, and the seal ring is effective between those annular surfaces to preclude the entry of foreign material, such as dirt and dust, and thus the joint is stable and secure and it is also kept clean. Accordingly, it is an object of this invention to provide a track joint with the aforementioned characteristics and to do so with a simplified thrust ring and seal ring arrangement.

Accordingly, it is an object of this invention to provide a track joint with a seal member used in conjunction with a thrust ring, wherein the seal member precludes entry of dirt and dust and the like in the space between the links and parts of the track chain and wherein the seal member is self-positioning and adjustable for efficient and constant sealing action. Further, the aforementioned seal member is self-adjusting for wear between the parts and for wear of the seal member itself so that it continuously remains effective. Further, no special arrangement of the track chain parts is required in order to accommodate the seal member and the thrust ring of this invention.

Other objects and advantages will become apparent upon reading the following description in light of the accompanying drawings.

BRIEF DESCRIPTION OF THE DRAWINGS

FIG. 1 is a sectional view of a track chain joint incorporating a preferred embodiment of this invention.

FIG. 2 is an enlarged end elevational view of the thrust ring and seal member of this invention.

FIG. 3 is a sectional view taken along the line 33 of FIG. 2.

FIG. 4 is a side elevational view of FIG. 2.

DETAILED DESCRIPTION OF THE PREFERRED EMBODIMENT

FIG. 1 shows a fragment of one end of one joint of a track chain of the type used in a crawler tractor, such as more fully shown in my U.S. Pat. No. 3,948,574, and as readily understood by anyone skilled in the art. A track pin 10 is of the usual cylindrical configuration, and a cylindrical bushing 11 is piloted thereon and mates with the pin 10 along the line designated 12 which is the exterior circumference line of the pin 10. Thus the bushing 11 is cylindrical and has an outer surface 13 and an inner circular surface 14 which surrounds the pin 10 and snugly extends thereover but terminates short of the very end 16 of the pin 10, since the bushing 11 terminates in an end surface 17 which is a planar surface disposed on a plane transverse to the longitudinal axis designated 18 of the assembled pin 10 and bushing 11.

It will therefore be understood that the bushing 11 is free to rotate on the pin 10 though the bushing is relatively snug on the pin 10 and extends only over the intermediate length of the pin 10 which therefore has an extending end 16 projecting beyond the bushing end surface 17. Thus, there could be lubrication introduced into the track joint and between the pin 10 and bushing 11, if desired. Also, a conventional type of track chain link 19 is pressed onto the pin end 16 and extends completely therearound, and there is also a track link 21 which is pressed onto the bushing outer circumference 13 and extends therearound. It will be noticed that the links 19 and 21 define a space 22 therebetween, and the two links are thus arranged to pivot relative to each other about the axis 18 for the usual articulation of the track chain. As such, the link 19 is the outer link and the link 21 is the inner link of the track chain, and the construction described heretofore is a conventional construction, and the present invention provides a thrust ring and a seal member which adapt to and accommodate the conventional construction described heretofore. Thus, the track chain parts described present an annularly shaped space 23 which is defined by the bushing end surface 17 and the track link end surface 24. These two surfaces are annular and are faced toward each other and are parallel to each other and are transverse to the longitudinal axis 18, all for presenting the space 23 therebetween. Also, the link 19 has a circular surface 26 which defines the outer circular limit of the space 23.

Thus, a thrust ring 27 is press-fitted onto the pin extending end 16 and it extends endlessly therearound and is thus affixed with the pin 16 to rotate therewith. The thrust ring 27 has two opposite end planar surfaces 28 which are in respective abuttment with the end surfaces 17 and 24, as shown in FIG. 1. Therefore, the thrust ring 27 abuts the end surfaces 17 and 24 and maintains the spacing between the bushing 11 and the link 19, as shown in FIG. 1. The thrust ring 27 is of a rigid material, such as glass reinforced nylon, for serving the purpose of a thrust ring to space the members apart as shown and as described herein.

A seal member 29 is in a ring shape and has a body portion 31 in snug contact with the outer circumference of the thrust ring 27 and extends endlessly therearound, and the member 29 is of an elastomer material and is therefore pliable and flexible to serve as a dirt and lubricant seal member. The seal member 29 may be combined with or a separate piece relative to the thrust ring 27, that is, it may be bonded with the ring 27 or it may otherwise be secured thereto as hereinafter described, or it may be in only a tight and snug relationship thereto.

The seal member 29 has two extending legs 32 which diverge outwardly and away from each other and which are an integral part of the ring 29 and which terminate in circular edges 33, as shown in FIGS. 2, 3, and 4. It will be further noticed that the axial length of the body portion 31 is shown to be less than the axial length of the thrust ring 27, and there is thus the recess or indentation designated 34 on the seal member 29 in the FIG. 1 position. This arrangement assures that the legs 32 will sufficiently flex and adjust themselves to have the seal edges or rings 33 in compressed and thus sealing contact with the respective end surfaces 17 and 24, as shown in FIG. 1. Also, with that arrangement, the seal member legs 32 are free to flex and stretch in response to the relative rotational movement of the bushing 11 and the link 19 about their common axis 18, during the articulation of the track chain. Accordingly, the seal member 29 remains in efficient and snug sealing contact with the end surfaces 17 and 24 and thus precludes the entry of dust and dirt into the track chain and radially inwardly of the seal member 29 to therefore protect the pin 10 and bushing 11 from having dirt get to the surface line designated 12.

The seal member legs 32 define a space 36 therebetween, and thus the space 36 also accommodates the flexing of the legs 32 toward and away from each other for the self-adjustment and accommodation of the seal member 29 relative to the end surfaces 17 and 24. FIG. 1 further shows that the seal member 29 is arranged, both in the configuration shown and described and in the elasticity of the material used therein, such that the circular edges 33 become somewhat flattened and compressed against the surfaces 17 and 24 to therefore provide a complete and high pressure seal at those surfaces, all as desired and as mentioned herein.

FIGS. 2, 3, and 4 show the arrangement of the thrust ring 27 and the seal member 29, and here it will be further seen that the axial length of the seal ring 29 between its circular edges 33 and in the free body or unassembled form shown in FIG. 3 is greater than the axial length between the thrust ring end surfaces 28. Therefore, the compression of the seal member 29 between the surfaces 17 and 24 is assured and therefore the desired sealing efficiency is achieved. Further, the circular edges 33 are formed by the angles shown at the extending ends of the legs 32, such that the edges 33 lie on a circle of lesser diameter than that of the full extent of the ring 29 as defined by the circular edges 41, and they are therefore line edges for high pressure contact with the annular end surfaces 17 and 24 for effective sealing. That is, the edges 33 are each located at the juncture of, and are formed by, those angles defined by surfaces 42 and 43 which are bevel surfaces extending axially inwardly on ring 29, from edges 33, and oblique to the longitudinal axis of the ring 29. The edges 33 are therefore spaced radially inwardly from the radial outer limit of the ring 29, so there is the stock of the ring 29 radially extending beyond the edges 33 to be supportive of the edges 33, and therefore the edges 33 can be firmly compressed against the surfaces 17 and 24. Still further, the legs 32 can actually be twisted in opposite rotational directions to each other in response to the relative rotation between the bushing 11 and the link 19.

FIGS. 2 and 3 further show an arrangement for rotationally securing the seal member 29 relative to the thrust ring 27, and this is achieved by having several projections 37 extending on the radially outer circumference 38 of the thrust ring 27, and accommodating indentations 39 are formed on the inner circumference of the seal member 29 for securing the two rings together. Thus, the elastomer seal ring 29 can be slightly stretched onto the thrust ring 27 and thus be snug thereon and retained in position by means of the projections 37 and notches 39 intermated between the two rings. Also, the seal ring 29 could be otherwise secure to the thrust ring 27.

The seal ring 29 is therefore symmetrical about a center plane extending transverse to the central axis 18 of the ring 29 and thus extending between the legs 32. Further, the entire arrangement is such that the rings 27 and 29 can be readily assembled with the remainder of the track chain, and also those two rings can be readily removed and easily replaced as desired and if needed.

What is claimed is:

1. A track joint with a thrust ring and a seal ring, comprising a track pin, a cylindrical bushing on said pin and terminating in an annular surface disposed on a plane transverse to the extent of and within the length of said pin, a track link on the end of said pin and having an annular surface, said annular surfaces being spaced apart and faced toward each other and extending radially from and beyond said pin on respective planes transverse to the longitudinal axis of said pin, a thrust ring of rigid material fitted on said pin between and in abutting contact with said annular surfaces at the radially inward portions of said annular surfaces for maintaining said bushing and said link spaced apart, and an elastomer seal ring extending around said thrust ring in snug endless circular contact therewith and radially outwardly therefrom and being disposed completely in the space between said annular surfaces, mated projections and notches on said thrust ring and said seal ring at the snug contact therebetween, for securing said seal ring on said thrust ring, said seal ring having an annular body portion and two radially outwardly extending legs having a radial extent less than that of said annular surfaces to be disposed within the radial limits of said annular surfaces, said legs having circular edges at the axially opposite ends of said seal ring and with said circular edges being in respective compressed contact with said annular surfaces for sealing therewith, said circular edges being spaced radially inwardly from the radial outer limit of said seal ring and being disposed on respective planes beyond the planes of the axial ends of said thrust ring, in the free body condition of said seal ring, for effecting the compressed contact with said annular surfaces.

2. The track joint with a thrust ring and a seal ring as claimed in claim 1, wherein said seal ring is symmetrically shaped about a plane between said legs thereof, and said legs extend away from each other in the directions parallel to the axis of said seal ring, and said legs are flexible toward and away from each other.

3. The track joint with a thrust ring and a seal ring as claimed in claim 2, wherein the total thickness of both said legs is less the distance between said annular surfaces, and said legs being elastomer-urged away from each other and into sealing contact with said annular surfaces.

4. The track joint with a thrust ring and a seal ring as claimed in claim 1, or 2, or 3, wherein the axial length of said body portion is no greater than that of said thrust ring.

5. The track joint with a thrust ring and a seal ring as claimed in claim 1, wherein said circular edges are each located at the juncture of and defined by two surfaces faced axially of said seal ring and oblique to the longitudinal axis of said seal ring, for support of said circular edges by the material constituting said surfaces.

* * * * *